April 2, 1957 D. LABINO 2,787,542
GLASS PAPER
Original Filed Sept. 17, 1951 2 Sheets-Sheet 1
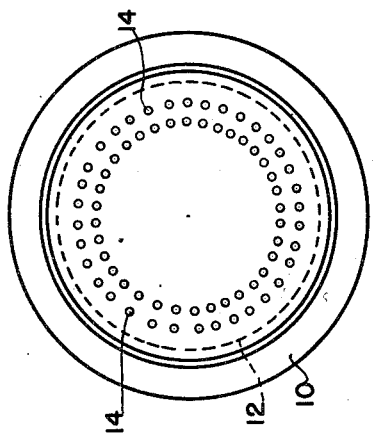
FIG-3
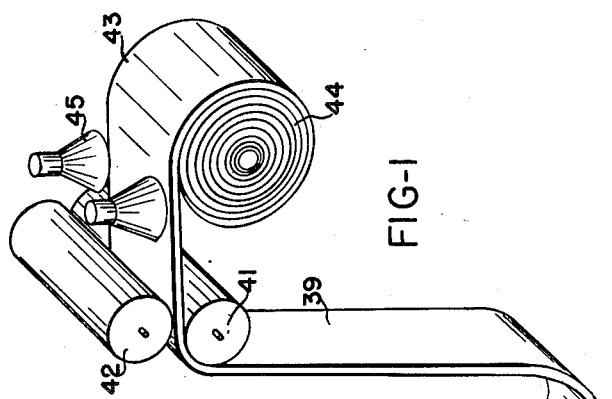
FIG-1
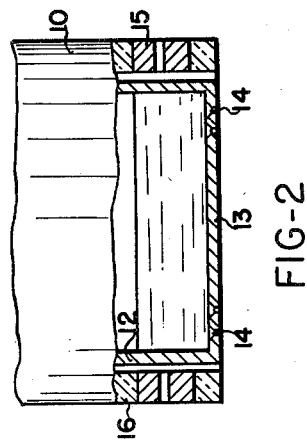
FIG-2
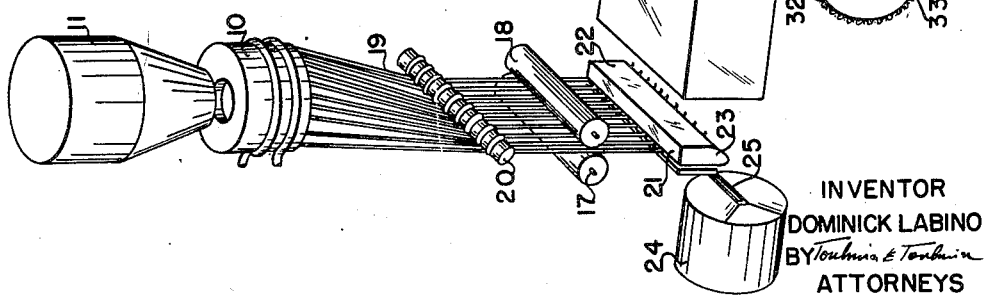
INVENTOR
DOMINICK LABINO
BY Toulmin & Toulmin
ATTORNEYS April 2, 1957 D. LABINO 2,787,542
GLASS PAPER
Original Filed Sept. 17, 1951 2 Sheets-Sheet 2

INVENTOR
DOMINICK LABINO
BY Toulmin & Toulmin
ATTORNEYS

United States Patent Office 2,787,542
Patented Apr. 2, 1957

2,787,542

GLASS PAPER

Dominick Labino, Maumee, Ohio, assignor, by mesne assignments, to L. O. F. Glass Fibers Company, Toledo, Ohio, a corporation of Ohio Original application September 17, 1951, Serial No. 247,010. Divided and this application March 13, 1952, Serial No. 276,389

2 Claims. (Cl. 92—3)

This invention relates to a new article of manufacture comprising glass paper.

Paper consisting of glass fiber has heretofore been unknown in the art. Attempts made to produce glass paper have resulted in failure because of the lack of any tensile strength in the material produced which rendered it useless as a paper in the many uses to which paper is adapted. Further, the material produced lacked surface finish and hardness, making it unsuitable for use as paper.

However, I have discovered that fine glass fibers of uniform diameter, on the order of one micron and less, mat or felt together with self-adhesion to an extent that good tensile strength is imparted to the product produced and that a smooth, hard surface finish can be given to the material, thereby making it satisfactory for use as paper. With the glass fibers having uniformity of diameter and uniformity of length, extreme uniformity of the paper is obtained.

Paper made of glass fibers according to this invention has characteristics that are not capable of reproduction in papers made from natural fibers, thus making glass paper adaptable for special purpose applications in which papers made from natural fibers cannot be used. For example, electronic components in which insulating papers are used are limited to a top temperature value of about 85° C., principally because of the destruction of the paper base of the component under heat. Thus, a paper made of glass fibers will permit of higher temperature elevation of electronic components because the basic fiber does not deteriorate at low temperature.

Glass paper also has a very low coefficient of expansion which eliminates difficulties resulting from expansion and contraction and since the glass fibers are non-hydroscopic, there is no change in dimensional size resulting from changes in moisture content of the paper. These characteristics are useful in the printing industry. Also, with the glass paper having a hard smooth surface, it is capable of receiving writing and printing.

Attempts at making papers from other synthetic fibers have resulted in products unsuitable for many uses to which paper is adapted as the synthetic fibers have required bonding, either by plasticizing the fibers slightly, or bonding has been obtained by the use of synthetic binders. Papers of this nature, however, are still highly susceptible to deterioration by heat or the bonding agent introduces a foreign substance into the paper which is subject to deterioration or makes it undesirable for use in special applications. The bonding together of smooth surfaced synthetic fibers has, therefore, been a substantial problem in any attempt to produce a true paper from fibers other than natural fibers.

It has been discovered, however, that when glass fibers are produced with diameters such that they approach dimensions of particles of colloidal suspensions, that the glass fibers when placed in a thin mat exhibit characteristics entirely different from those exhibited by glass fibers of larger diameter when placed in mat form. That is to say, that when glass fibers having a diameter of about one micron or less are arranged in a thin mat form, the fibers exhibit felting or matting characteristics and characteristics of surface adhesion that result in a physical interlocking of the fibers together to an extent that a matted or felted web of such glass fibers exhibits substantial tensile strength. This is probably brought about because of the great surface area to weight ratio of the extremely fine glass fibers. The surface area of such fine fibers in a web of any density is so great that there is an actual surface adhesion between the fibers. Also, this result is occasioned because of the diameter to length ratio of the fibers wherein the length of the fiber is 500 to 1000 times the diameter resulting in extreme flexibility of the fiber which permits it to mechanically interlock with the other fibers of like diameter and length.

Also, unlike natural fibers, glass fibers, when properly manufactured, are given the characteristics of uniform diameter and substantially uniform length. Thus a paper made from glass fiber of uniform diameter, and if desired, of uniform length, exhibits uniform physical, electrical and chemical characteristics as distinguished from non-uniform characteristics of paper made from natural fibers because of the varying diameter and length of the natural fibers.

It is, therefore, an object of this invention to produce a paper composed of glass fibers of the character that the paper will have good tensile strength and will have uniform physical, electrical and chemical characteristics.

It is another object of the invention to produce a paper composed of glass fibers wherein the glass fibers have the characteristic of self-adherence providing for a paper composed exclusively of glass fiber.

It is another object of the invention to produce a paper composed of glass fiber in accordance with the foregoing object wherein the glass fibers of which the paper is composed have an average diameter of substantially one micron or less whereby the fiber diameters approach uniformity and wherein the length of the fibers also approach uniformity.

It is still a further object of the invention to produce a paper composed of glass fiber in accordance with the foregoing object wherein the diameter average of the glass fibers is held within a range of 0.1 to 1.0 micron.

It is still a further object of the invention to produce a paper wherein glass fiber is the sole component, and which paper will have good tensile strength to permit of handling of the glass paper as paper.

It is another object of the invention to provide a paper composed of glass fiber wherein the average diameter of the glass fibers is maintained at a selected micron size of one micron or less with a major portion of at least 50% or over of the glass fiber being of uniform size at a determined micron or sub-micron diameter, the major portion of the glass fiber being within a range of 0.3 micron of the established micron diameter.

These and other objects will be apparent from the drawings and the following description.

In the drawings:

Figure 1 is a diagrammatic representation of apparatus for manufacturing glass paper according to one method for its production.

Figure 2 is a cross-sectional view through the glass-melting chamber of the apparatus of Figure 1.

Figure 3 is a bottom view of the heating chamber of Figure 2.

Figure 6:
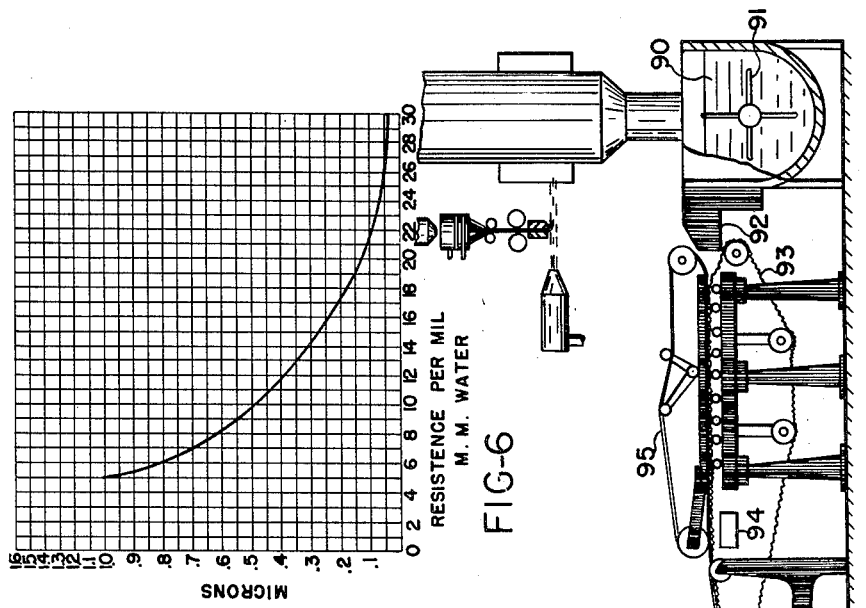
Figure 6 is a scale representing resistance of glass paper versus average micron diameter of the fiber.

In the manufacture of paper from natural fibers, such as those from the various celluloses, it is recognized in the art that a wide variation in quality of a paper product results from the unpredictable variations in natural fibers. Thus, quality control of papers made from natural fibers is one of the major factors that must be constantly watched and regulated during production of paper. This is particularly true in the production of papers for special applications where uniform quality and physical characteristics of the paper must be carefully retained so as to secure as nearly as possible uniform characteristics in the products in which the paper is used. One such example is paper products for the electronics industry wherein the uniformity of quality of the paper, such as dielectric property, is a major factor in determining whether the electrical components using the paper will have uniform electrical characteristics. There are, of course, many other applications in which uniform quality control of paper is a major factor.

Because of the wide variation in the diameter and length of natural fibers, and because of the inherent natural variation of the fibers themselves, a wide variation in quality of the paper made from such fibers results, such as in physical, chemical and electrical characteristics. The variations in the paper are carried into the electrical components, for example, in which the paper is used, and there is no satisfactory way to overcome the inherent natural variations in the characteristics of the paper made from natural fibers.

A paper made from fibers having uniform diameter and length is capable of exhibiting uniform physical, chemical and electrical characteristics. Such a paper is that which can be made from glass fibers according to this invention, the glass fibers having uniform diameter of substantially one micron or less. In any paper made from such glass fibers, the average micron diameter size of the glass fiber from which the paper is made is preestablished and the fiber is maintained uniform at that preestablished micron or sub-micron diameter size. The average variation from the established micron or sub-micron size does not vary more than ±0.45 micron, except for occasional glass fibers of somewhat larger diameter and occasional fiber of somewhat smaller diameter. However, the average micron size is maintained within the aforementioned limits. Preferably, the limits are carefully controlled to retain the micron size of the diameter of the glass fiber to within approximately 0.3 micron from the desired and established micron or sub-micron size. Thus, there is established a uniformity of the diameter of the glass fiber that has heretofore been unobtainable in synthetic fibers of any kind, including glass fibers. The uniformity of the diameter of the glass fiber is a result of the manner of production of the fiber, which will be hereinafter described.

Glass fiber of a diameter of two micron and above are readily measurable in high-powered microscopes, but as the micron diameter of the glass fiber reduces to one micron and less, it becomes more difficult to establish the sub-micron diameter of the glass fiber, except through the use of electron micrographs, and the field of vision of such instruments is so small in relation to the length of the fibers involved that their average diameter is difficult of determination.

A standard of comparison has, therefore, been established in conjunction with the United States Navy Department and the Bureau of Standards by which the resistance per mil of thickness of a paper made from glass fiber is referenced to micron size of the fiber to establish average sub-micron diameters of the glass fiber. Such a scale is illustrated in Figure 6.

The scale is the result of a long series of experimental tests using papers made of glass fiber of increasingly small sub-micron diameter. The standard of comparison is that established by passage of 85 liters of air per minute through 100 square centimeters of a glass paper and measuring the resistance across the paper in millimeters of a water column. The total resistance is divided by the mil thickness of the paper to give readings of resistance per mil thickness and this is then converted to average fiber diameter in sub-micron size.

For example, a glass paper having a resistance of 5 millimeters of water per mil thickness upon passage of 85 liters of air per minute through 100 square centimeters of the paper has an average micron diameter size of the fiber established at one micron as distinguished from a paper having a resistance of 22.5 millimeters of water per mil thickness, the latter having an average diameter of the glass fiber established at 0.1 micron.

Electron micrograph inspection of the glass fiber of sub-micron diameter establishes that over 50% of the glass fiber is uniform at an established micron diameter ±0.3 micron, and with over 75% of the fiber being within a range of 0.45 micron with only a scattering of larger and smaller fibers.

In the method of producing glass fibers for producing paper more fully disclosed in my co-pending application, Serial No. 247,010 filed September 17, 1951, now abandoned, of which this application is a division, the glass fiber is produced under controlled conditions such that the average fiber diameter is maintained relatively uniform within the limits established herein. Also, the length of the glass fiber may be held to a uniform length. Hence, glass paper made from such fiber exhibits highly uniform physical, chemical and electrical characteristics, such as, tensile strength, chemical resistance, and dielectric properties.

Thus, as a filtering media, paper made of glass fibers having uniform diameter of micron size or less is superior to filter media made from natural fiber because of the uniformity of the interstices between the glass fibers. Because of the smallness of the interstices between the glass fibers, an extremely efficient filtering media is produced, in fact one that filters smoke from the air.

The glass paper made according to this invention is highly absorbent to liquid and as a result can be saturated with various resins to give to the paper special physical or electrical properties. In fact, such papers have demonstrated their ability to take up as much as twenty-one times their own weight of the saturating solution.

It has been discovered that glass fibers having a diameter of about one micron or less disperse uniformly in a fluid carrier, either air or liquid, and when in the liquid, they are much the same as a colloidal solution. Thus, a fluid carrier containing glass fibers of a diameter of one micron or less is homogeneous in nature so that the fibers can be separated from the fluid in a uniform homogeneous mass with resultant uniformity of density of the collected mass of glass fibers.

If the uniformity of diameter of glass fibers is not retained within the average limits referred to herein, the paper resulting from use of such non-uniform fibers exhibits the same objectionable variations in physical, chemical and electrical characteristics as that exhibited in papers made from natural fibers. Hence, uniformity of diameter of the glass fibers is of critical importance in the manufacture of a glass paper having uniform physical, chemical and electrical characteristics. Preferably also, the glass fibers shall be substantially of the same length.

Glass fibers having a diameter of one micron or less when incorporated into a paper exhibit the characteristic of self-adhesion, even though the surface of the glass fibers is entirely smooth, resulting in a glass paper having substantial tensile strength. This self-adhesion of the glass fibers is occasioned merely by wetting the fiber with water and collecting the wet fiber as a web or sheet, or the fiber can be collected in dry form and thereafter wet with water. No binder whatever is necessary to secure the self-adhesion of the glass fibers. A paper made from water wet fibers exhibits good tensile strength and uniformity of structure.

To determine the tensile characteristics of the glass paper, test sheets of the paper are made on standard laboratory sheet-making equipment of the same type that is normally used in preparation of test sheets of paper made from ordinary pulps. The sheet mold that is used is of a standard variety, such as that made by Valley Iron Works Company of Appleton, Wisconsin, their sheet mold, Model G.

In preparing the sample sheet, the general procedure recommended by Technical Section, American Pulp and Paper Industry, is followed. Specifically, approximately two grams of glass fiber is placed in about three pounds of water and is beaten in a standard disintegrator that meets the standards of American Pulp and Paper Industry, Standards Specification T–200–m, for ten minutes. This prepared slurry is placed in a standard sheet mold together with sufficient water to bring the water content to ten pounds, thus giving a thin slurry similar to that of a paper pulp. The water is then drained from the sheet mold and after about ten seconds the sheet is couched off the wire of the mold. This results in a sample sheet of glass paper approximately ten mil in thickness and 16 3/16" in diameter. The sheet is then dried, after which a standard tensile strength test is made of the so-prepared sheet.

Sheets prepared in this manner are those also used in establishing the average sub-micron diameter of the glass fibers of which the sheet is composed as hereinbefore described.

It has been determined that when the average diameter of the glass fibers is from 2.5 to 3.0 micron, it is not possible to produce a paper as there is complete disintegration of the mass of fiber with no possibility of securing tensile strength tests on such mass. Such fibers do not retain a sheet shape nor can the mass of fiber be picked up in the hand as it completely falls apart.

When the average diameter of the glass fiber is from 1.5 to 2.5 micron, the mass of fiber resulting from the making of a test sample in accordance with the aforementioned procedure retains the general sheet shape of the sheet mold, but the sample cannot be picked up manually as there is insufficient tensile strength in the sheet to hold the fibers together for support of the sheet sample.

However, as the average micron size of the glass fiber reduces to one micron and less, sheet samples produced in accordance with the aforementioned procedure exhibit tensile strength such that a sheet can be handled manually as paper.

For example, a sheet sample composed of glass fiber of an average diameter of one micron exhibited tensile strength of 0.5 pounds per square inch. Another sheet sample having average fiber diameter of 0.6 micron exhibited a tensile strength of forty pounds per square inch and another sample sheet having fiber diameter of an average of 0.16 exhibited a tensile strength of ninety-four pounds per square inch.

The self-adhesion is greatly increased by wetting the fiber with an acid water. It has been discovered that each glass of a different glass composition and a different alkaline content has a critical pH value of the water with which it works best. The effect of the correct pH value of the water made acid by any of the common acids, such as hydrochloric and sulphuric for example, is that of obtaining a much greater and a more even dispersion of the glass fiber in the water. The effect is much the same as would be occasioned by the use of a greatly increased quantity of water to disperse the same amount of glass fiber. Also, a more uniform dispersion is obtained to an extent that less bunching of the fibers occurs in the water and the fibers seem to repel one another whereby each fiber is separately dispersed in the water.

It has been discovered that as the alkaline content of the glass is lowered, the acidity of the water in which the glass is dispersed must be increased. Fibers made from a high alkaline glass disperse readily in an acid water having a pH value of about 6.0, whereas the fiber made from a low alkaline glass disperses in the water only when the pH value of the water is reduced to a value in the neighborhood of 2.0. Thus the acid content of the water is inversely proportional to the alkaline content of the glass.

Tests performed on fibers of medium alkaline content show the best dispersion of the fiber in the water when the pH value of the water is about 3.5. As the pH value of the water is increased to about 5.0 or decreased to about 2.5, the uniformity of dispersion of the fiber in the water gradually decreases so that a pH range of approximately 2.5 is established relative to the critical pH or the preferable pH for the water for any glass of a particular alkalinity.

For example, in a glass having a low alkaline content, such as 1/2% of sodium or potassium, the critical pH of the water to obtain maximum dispersion of the glass fiber is around 2.0, whereas in a glass of high alkaline content, containing 20% sodium or potassium content for example, the critical pH value of the water obtaining maximum dispersion of the glass fiber in the water is about 6.0. Thus the acid content of the water is inversely proportional to the alkaline content of the glass. In any event, the pH range of the water from the critical value is not more than 1.5 on either side of the critical value.

Tests have shown that when glass fiber in the micron range is wet with an acid water and paper formed therefrom that the tensile strength of the paper is increased at least three times over that wet with an ordinary tap water over which no control has been maintained of the pH value in relation to the alkaline content of the glass.

When the fibers are wet with a liquid they compact and felt into a self-adherent pulp-like mass which, when dried, gives a paper product of good tensile strength. Also, the self-adherent mass can be pressed while wet under any desired pressure which increases the tensile strength of paper product so produced.

To obtain glass fibers of a uniform diameter of one micron or less and retain the average diameter of the fibers within a range herein referred to, the conditions under which the glass fibers are produced are critical to the extent that conditions once established must thereafter be maintained constant to hold the sub-micron diameter of the fiber constant. The glass fiber is of the class known as staple fiber, but the length to diameter ratio is exceedingly high with the sub-micron diameter of the fiber providing for extreme flexibility and mechanical strength of the fiber.

In Figures 1 and 2 there is illustrated an apparatus for obtaining glass fibers of one micron in diameter or less and for producing paper from such fiber. In Figure 1 there is illustrated a heating and melting chamber 10 into which glass marbles are fed from a supply hopper 11. The glass marbles are fed into the heating and melting chamber 10 at periodic intervals governed by the rate of removal of glass from the heating and melting chamber. Since the marbles are approximately 1/2" in diameter and the heating and melting chamber 10 is approximately 5" in diameter, with the molten glass mass about 2.5" deep, the level of molten glass in the heating and melting chamber is maintained at a constant level since the small amount of glass added by the dropping of a marble into the body of molten glass in the heating and melting chamber is insufficient to cause any noticeable effect on the level of the molten glass in view of the small volume of the marble relative to the volume of the molten glass in the heating and melting chamber.

The heating and melting chamber 10 is more particularly illustrated in Figure 2 wherein it is illustrated as consisting of an inner metal chamber 12 that is circular or cylindrical in shape. The chamber 12 is preferably constructed of platinum to resist the action of the molten glass contained within the chamber.

The bottom wall 13 of the chamber 12 contains a plurality of openings 14 through which molten glass exudes from the chamber 12. These openings 14 are arranged in circular rows near the periphery of the chamber 12 as illustrated in Figure 3. A heating coil 15 is placed around the exterior of the chamber 12 and is adapted for connection to a source of high frequency energy which may, for example, be an electronic high frequency oscillator, or a high frequency generator. The heating coil 15 is placed substantially at the glass melting level of the molten glass in the chamber 12 to effect uniform heating conditions throughout the body of the molten glass in the heating chamber or pot 10. The heating chamber 12 is preferably surrounded with a ceramic heat insulating material 16 to conserve heat therein.

It has been determined over a long period of experimentation and manufacture of glass fibers that the heating of glass by the use of a high frequency current in a heating coil that is placed around a circular heating chamber and positioned uniformly around the chamber results in obtaining absolute uniformity of viscosity of the molten glass throughout its entire mass within the heating chamber.

With the level of the molten glass maintained constant within the heating chamber 12 and with the viscosity of the molten glass absolutely uniform throughout the entire mass thereof, thereof, there is effected identically the same head of glass above each opening 14 in the bottom wall of the heating chamber 12 at a viscosity of exactly the same as that which occurs in the head of glass above every other opening in the bottom wall of the heating chamber. The head of glass above each of the openings is exactly the same because of the parallel placement of the bottom wall of the heating chamber relative to the level of molten glass therein. As a result, exactly the same quantity of molten glass is exuded through each of the openings 14 from the heating chamber 12.

The head of glass above the openings 14 establishes a uniform pressure differential between opposite sides of the body of the glass to cause the glass to exude through each of the openings at a constant rate in constant volume. However, a positive pressure can be established above the body of molten glass in the chamber 12 should it be desirable to obtain a flow rate of the molten glass through the openings 14 greater than that occasioned by the normal head.

The streams of molten glass from the chamber 12 cool quickly so that solidified glass fibers can be passed between the drawing rolls 17 and 18 for drawing of the molten glass as it leaves the chamber 12 into the fine fibers that pass between the drawing rolls 17 and 18. The glass fibers 19 pass over a guide 20 having a recess to receive each of the fibers whereby the fibers are arranged in planar relationship for entry to between the drawing rolls 17 and 18. The drawing rolls are preferably of a rubberlike material to frictionally engage the glass fibers 19 whereby to pull them downwardly from the heating chamber 12.

The drawing rolls 17 and 18 are driven by a suitable mechanical apparatus to rotate them at constant speed which is controlled to establish the diameter of the drawn glass fiber 19 at a predetermined and fixed value, for example, 0.005 to 0.007 inch.

With the flow of molten glass from the heating chamber 12 being at a uniform controlled rate from each of the openings 14, and with the drawing rolls 17 and 18 simultaneously drawing each of the molten strands into glass fiber from molten glass of exactly the same viscosity flowing at exactly the same rate, the drawn diameter of each of the primary glass fibers 19 will be exactly the same within but very minor limits of .0005 inch.

The primary glass fibers 19 are advanced by the drawing rolls 17 and 18 over the flat face 21 of a guide block 22 having a V-shaped edge 23.

In horizontal alignment with the V-shaped edge 23, there is provided a gas burner 24 that has a horizontal discharge slot 25 through which a high temperature high velocity gas blast is discharged directly at the ends of the glass fibers 19 below the edge 23 of the block 22. The high temperature gas blast melts the ends of the fibers 19 and the high velocity of the blast causes the molten glass from each of the fibers 19 to be blown from the end of the fiber and simultaneously therewith drawn into a glass fiber of extremely fine diameter of one micron or less.

With the primary glass fibers 19 having a diameter of from 0.002 to 0.007 inch, and with the high temperature high velocity gas blast having a temperature of 3300° F. or higher and a velocity of 1600–2000 ft./sec., glass fibers of 0.04 to 1.0 micron in diameter are produced.

By controlling the diameter of the primary glass fiber 19, the rate of feed, temperature and velocity of the burner gas at discharge slot 25, the diameter of the drawn staple fiber can be varied.

With the primary glass fibers 19 being fed uniformly into a burner blast of uniform temperature and velocity, the ends of the primary glass fibers are all rendered molten at the same rate with the result that the staple fiber blown from the ends of the primary glass fibers is of relatively uniform length, as well as being uniform in diameter.

Thus, under controlled conditions, staple fiber having a diameter of one micron or less can be obtained with controlled uniformity of diameter and length of the staple fiber.

The staple glass fiber thus formed is directed into a collecting hood 30 that has a horizontally disposed opening 31 positioned directly above a fine mesh wire belt 32. The belt 32 is carried between rolls 33 and 34, and either of the rolls can be suitably driven whereby to drive the belt 32. A suction box 35 is placed beneath the upper portion of the belt 32, and beneath the opening 31 in the hood 30, and is adapted to be connected to any suitable apparatus for lowering the pressure in the box 35.

The suction box 35 draws the fine glass fibers directed into the hood onto the belt 32 which builds up into a loose mat 36 that is delivered from the hood 30, the thickness of the mat being governed by the speed of forward advancement of the belt 32 and the rate of collection of the glass fibers on the belt.

The staple glass fiber of micron size or less uniformly disperses itself in a fluid medium, such as, gas or liquid. This uniform dispersion of the glass fibers in the fluid medium results in a homogeneous flow of the fluid and glass fibers thereby causing uniform distribution of the glass fibers as collected upon the wire belt 32 under the hood 30. The final result is that a loose mat of glass fibers of micron diameter or less is produced that is of uniform density throughout the entire structure of the mat.

As the loose fibrous mat advances from the hood 30, a liquid spray 37, such as a water spray, is applied to the loose mat thereby condensing the loose fibrous mat into a wet felted mat of considerably less thickness. The wetting of the glass fibers of micron diameter or less causes them to compact and felt into a homogeneous web structure to sufficient tensile strength that the wet felted web structure supports itself and has substantial resistance to physical separation which allows the web to be handled in its wet condition.

The wet felted web is then treated to have the excess water removed from it as by applying heat to the web by means of a gas burner 40 to drive the water from the web. While in this wet condition and partially dried, the felted web 39 can be passed between press rolls to reduce the thickness of the paper thus formed.

If desired, after the paper leaves the press rolls 41 and 42, additional heat can be applied to the paper 43 to thoroughly dry the same, such as, by way of heat lamps 45.

As one example of production of glass paper according to the method of this invention, glass was melted in a heating chamber at a temperature of approximately 2650° F. The primary glass fibers were drawn to a diameter from 0.002 to 0.007". These primary glass fibers were advanced into a burner flame having a temperature of approximately 3300° F. with a blast velocity of 1600–2000 ft./sec. whereby staple glass fiber of a diameter of 0.04 to 1.0 micron with a length of from 1/8" to 3/8" was produced.

The staple glass fibers so produced were collected on a wire belt with the dry loose glass fiber being collected on the belt in a mat thickness of about 1/8" under a suction of 10 to 14" of water applied to the under side of the belt in the area on which the fiber is collected. This loose web or mat of glass fibers was wet with a water spray to compact the mat to a thickness of approximately 0.005". The compacted web of glass fiber was then heated to drive off excess moisture and while still damp was directed under a light-weight roller.

The paper produced as a result of this method had a thickness of 0.005", a density of .22 gr./cc., and a melting point of 1550° F. The paper exhibited a tensile strength in the dry condition of 220 p. s. i. and in the wet condition of 1150 p. s. i. It will be noted that the tensile strength of the paper is considerably greater in the wet condition than in the dry condition, the wet strength being approximately five times greater than the dry strength.

The superior characteristics exhibited by paper products according to the method of this invention is considered to be solely the result of uniformity of diameter of glass fibers of micron diameter and less, and uniformity of length of the fibers.

Figure 5:
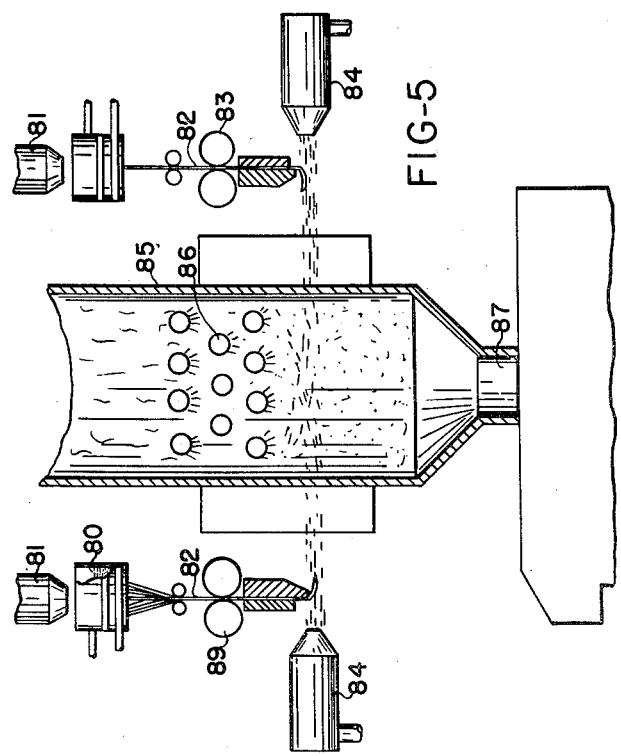
Figure 5 is a cross-sectional view of the glass fiber collecting apparatus of Figure 4.
Figure 4:
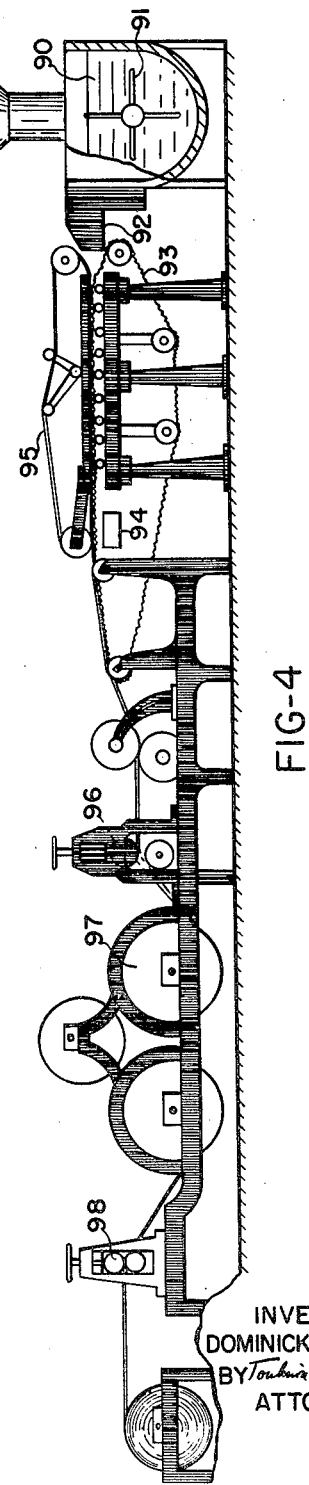
Figure 4 is a diagrammatic representation of apparatus for producing glass paper according to a method utilizing standard paper-making machinery.

In Figures 4 and 5, there is illustrated another arrangement of apparatus for performing the method of making paper according to this invention wherein the staple glass fiber of micron diameter and less is supplied directly to the pulp vat or chest of a standard paper-making machine with the result that the glass fiber is handled by the paper-making machine in the same manner as in the production of paper from natural fibers, but wherein the special characteristics of the glass paper attributable to the uniformity of the glass fibers is incorporated into the glass paper.

In the arrangement of Figures 4 and 5, there is provided apparatus for producing staple glass fiber of micron diameter and less in the same manner as heretofore disclosed and described with reference to Figure 1. The apparatus consists of a melting chamber 80 supplied with marbles from a hopper 81. The primary glass fibers 82 are drawn and attenuated by the rolls as at 83 and 89 in the same manner as heretofore disclosed and described in the corresponding apparatus of Figure 1.

The primary glass fibers 82 are heated and melted by a high temperature high velocity blast from the gas burner 84, causing production of staple glass fiber of micron diameter and less in the same manner as heretofore disclosed and described with reference to Figure 1.

The staple glass fiber of micron diameter and less so produced is directed into a vertically-arranged hood 85 that has a battery of water sprays 86 placed therein for causing a downward spray of water onto the staple glass fiber delivered into the hood 85. The water sprays will wet the glass fiber and carry it downwardly through the discharge opening 87 and thence into the pulp vat or chest 90 of a paper-making machine. The gases entering the hood 85 will exhaust upwardly from the hood, but the glass fibers will be washed from the exhausting gases by the water sprays 86. To supply sufficient glass fiber to maintain operation of a paper-making machine, a battery of staple glass fiber producing units may be located around the hood 85 to greatly increase the quantity of glass fiber produced and supplied to the pulp vat 90.

Water in sufficient volume is supplied to the pulp vat 90 and the glass fiber and water are continuously mixed by the stirrer 91 provided in the pulp vat. Since glass fiber of micron diameter and less disperses uniformly throughout a liquid in much the same manner as colloidal particles, a homogeneous solution of water and glass fiber flows from the head box 92 onto the wire 93 of a Fourdrinier type paper-making machine.

The wire 93 of the Fourdrinier paper-making machine passes over a vacuum box 94 to remove excess water from the pulp on the wire, the width of the web being controlled by the deckle straps 95. The pulp web formed on the wire 93 then passes between press rolls 96 as carried on the usual endless fabric belt which thereafter carries the web over the drier cylinders 97 and finally through finish press rolls 98.

While the invention disclosed and described herein is that of the preferred modification, yet it will be understood that those modifications that fall within the scope of the appended claims are intended to be included herein.

I claim:

1. A new article of manufacture comprising a thin paper-like sheet material consisting of staple glass fibers in a felted web secured together by self-adherence, from an acidic dispersion of glass fibers of submicron diameter in which the pH characteristic is in the range of 2.0 to 6.0, at least 50% of the fibers of said sheet material having diameters which are within ±0.3 microns, and at least 75% of the fibers being within a range of ±0.45 microns, the fibers having a length which is 500 to 1000 times their diameter, said material having a tensile strength in the dry condition sufficient to render it useful as paper.

2. A new article of manufacture comprising a thin paper-like sheet material as defined in claim 1, wherein the submicron diameter fibers have a length in the range between 1/8 and 3/8 inch.

References Cited in the file of this patent

UNITED STATES PATENTS

| | | |
|---|---|---|
| 1,829,585 | Dreyfus | Oct. 27, 1931 |
| 1,899,106 | Richter et al. | Feb. 28, 1933 |
| 2,461,841 | Nordberg | Feb. 15, 1949 |
| 2,481,543 | Stalego | Sept. 13, 1949 |
| 2,489,242 | Slayter et al. | Nov. 22, 1949 |
| 2,504,744 | Sproull et al. | Apr. 18, 1950 |
| 2,582,919 | Biefeld | Jan. 15, 1952 |
| 2,589,008 | Lannan | Mar. 11, 1952 |
| 2,626,213 | Novak | Jan. 20, 1953 |
| 2,635,390 | Parker | Apr. 21, 1953 |

OTHER REFERENCES

The Electrical Properties of Glass Fiber Paper, by Callinan et al., pp. 5–9, pub. by Naval Research Laboratory, May 1951. (Copy in Division 67.)

"Electrical Manufacturing," August 1951, pages 94–97. (Copy in U. S. Patent Office Scientific Library.)

"Technical News Bulletin," U. S. National Bureau of Standards, vol. 35 No. 12, page 177, December 1951. (Copy in Div. 67.)